(12) United States Patent
de Jong et al.

(10) Patent No.: US 6,597,934 B1
(45) Date of Patent: Jul. 22, 2003

(54) DIAGNOSTIC IMAGE CAPTURE

(75) Inventors: Elbert de Josselin de Jong, Bussum (NL); Monique H. Van der Veen, Almere (NL); Elbert Waller, Amsterdam (NL)

(73) Assignee: Inspektor Research Systems B.V., Amsterdam (NL)

( * ) Notice: Subject to any disclaimer, the term of this patent is extended or adjusted under 35 U.S.C. 154(b) by 244 days.

(21) Appl. No.: 09/706,924

(22) Filed: Nov. 6, 2000

(51) Int. Cl.$^7$ ................................................. A61B 5/05
(52) U.S. Cl. ....................................... 600/407; 600/443
(58) Field of Search ................................ 600/407, 476, 600/477, 300, 443; 128/920, 922; 348/77, 135; 382/284, 294

(56) References Cited

U.S. PATENT DOCUMENTS

| | | | |
|---|---|---|---|
| 3,969,577 A | 7/1976 | Lloyd et al. | 178/6.8 |
| 4,591,784 A | 5/1986 | Kolitsch et al. | 324/208 |
| 5,359,513 A | 10/1994 | Kano et al. | 364/413.23 |
| 5,490,225 A | 2/1996 | Kumagai | 382/227 |
| 5,779,634 A | 7/1998 | Ema et al. | 600/407 |
| 6,132,210 A * | 10/2000 | Lehmann | 433/26 |
| 6,205,259 B1 * | 3/2001 | Komiya et al. | 382/284 |
| 6,402,693 B1 * | 6/2002 | Emery | 600/443 |

FOREIGN PATENT DOCUMENTS

| | | |
|---|---|---|
| EP | 0 068 286 | 6/1982 |
| WO | WO 99/28698 | 6/1999 |
| WO | WO 99/58043 | 11/1999 |
| WO | WO 00/21450 | 4/2000 |

OTHER PUBLICATIONS

T. Lehmann, et al.; Computer–based registration for digital subtraction in dental radiology; Dentomaxillofacial Radiology; 29, pp. 323–346 (2000).
A.K. Jain; Fundamentals of Image Processing; Prentice Hall, USA, Section 9.12, pp. 400–407 (1989).
M. Uenohara and T. Kanade; Vision–Based Object Registration for Real–Time Image Overlay; pp. 13–22 (1995).
T. Lehmann, et al.; A Comparison of Similarity Measures for Digital Subtraction Radiography; Comput. Biol. Med., vol. 27, No. 2, pp. 151–167 (1997).
T. Lehmann, et al.; Image processing and enhancement provided by commercial dental software programs; Dentomaxillofacial Radiology; 31, pp. 264–272 (2002).
Oral Diagnostic Systems (internet publication); Impact of Digital Radiology (date unknown).

* cited by examiner

Primary Examiner—Quang T. Van
(74) Attorney, Agent, or Firm—Woodard, Emhardt, Moriarty, McNett & Henry LLP

(57) ABSTRACT

A novel medical diagnostic imaging system, method, and apparatus is disclosed. In one embodiment, a reference image is compared with each image in an image stream, and a similarity value is calculated to reflect the degree of similarity between them. If the similarity value is high enough, the image is saved for later use by the diagnostician.

In other embodiments, a running list is maintained of the x best-matching frames from the video stream. Images from the list are displayed for the operator.

21 Claims, 4 Drawing Sheets

DIAGNOSTIC IMAGE CAPTURE

BACKGROUND

The present invention relates to a system, method, and apparatus for diagnostic imaging. More specifically, a stream of images is compared to a reference image of the diagnostic subject, and image frames with a level of similarity to the reference image are stored for use by a diagnostician in comparison with the reference image.

Imaging is used for diagnosis and analysis in various medical fields. In many such applications, a series of images of the diagnostic subject (e.g., a tooth, bone, tumor, or breast), typically including an initial baseline, or "reference," image and subsequent images, depict changes in a particular structure or structures. Similarities and differences between the baseline image and the later-acquired images are examined and interpreted to aid in the diagnosis or study.

A major difficulty with these tools for diagnosis is acquisition of the baseline and later-acquired images from (at least approximately) the same angle, rotation, and zoom/distance with the same lighting conditions and (especially when soft tissues are involved) locations of structures within the subject. Rigid frames have been used in attempts to fix the camera and subject in the same relative position for each image acquisition. Such frames, however, often result in significant discomfort for the patient and may still yield images that are not very well matched with the baseline image. Poorly matched images are, of course, less useful than well matched images for diagnosis and study.

There is thus a need for improved systems, methods, and apparatuses to acquire images for use in diagnosis and study.

SUMMARY

It is, therefore, an object of this invention to provide a novel imaging system, method, or apparatus for medical diagnostic imaging. Another object is to provide a medical diagnostic imaging system, method, or apparatus that is easier to use than certain available systems. A still further object is to provide a system, method, or apparatus that yields time-series images with improved suitability for use in medical diagnostics and study.

One form of the present invention is a unique medical diagnostic imaging.

In another form of the present invention, a reference image is compared to a series of captured images from an image stream. The level of similarity between the reference image and the captured image is determined and used to decide whether to store the captured image for diagnostic use. In one embodiment of this form, all captured images with a level of correlation above a pre-determined level are stored. In another embodiment, the best n captured images are stored for diagnostic use. In some embodiments, the level of similarity is represented by a number, the similarity value. In some embodiments, the evaluation of the similarity between a captured image and the reference image is accomplished using analog techniques, while in other embodiments the level of similarity is determined using digital techniques.

Another form of the present invention is a method for collecting images for medical diagnostic use, wherein a reference image is compared with a captured image from an image stream to determine the level of similarity between the two images. Based on that level of similarity, a decision is made whether to retain or discard the captured image. In some embodiments, the reference image and the image stream are displayed together as the image stream is captured, for example, in side-by-side windows on a computer monitor. Other embodiments show the reference image and the image stream in the same window, wherein the lines from the two images are interlaced. In yet other embodiments, the difference image between the reference image and the image stream is displayed during capture. In still other embodiments, the shadow of one is placed over the other and displayed during capture.

In another form of the present invention, a system comprises data storage (containing a reference image of a diagnostic subject); an image stream of captured images showing the diagnostic subject; a processor, connected to the data storage, that receives the image stream; and a computer readable medium encoded with programming instructions executable by the processor to (1) calculate a similarity value for each captured image; and (2) determine whether to store the captured image based on its similarity value.

Other embodiments, forms, variations, objects, features, and applications may appear to those skilled in the art from the drawings and description contained herein.

DETAILED DESCRIPTION OF THE PREFERRED EMBODIMENTS

Figure 1:
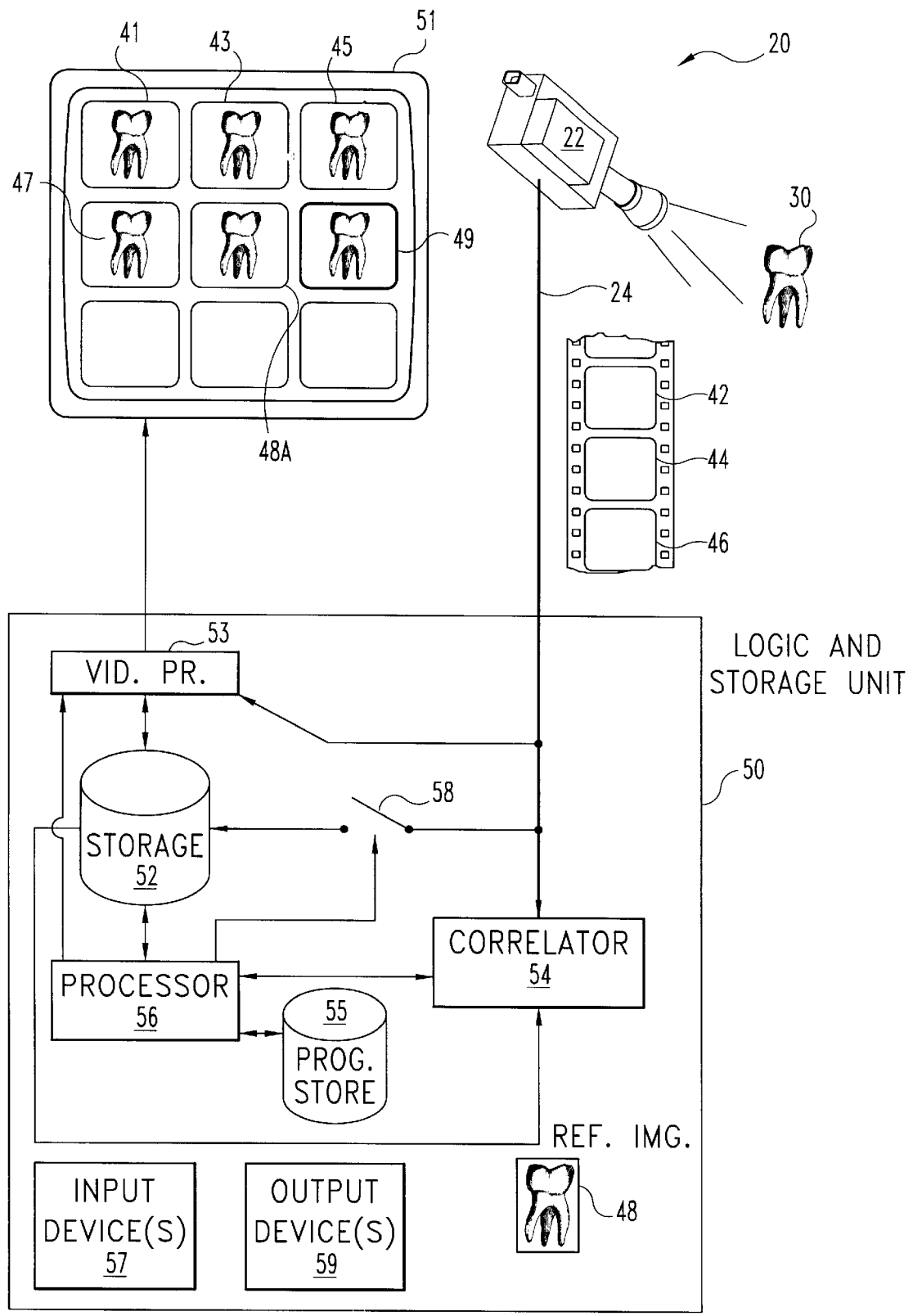
FIG. 1 is a block diagram of a diagnostic imaging system according to one embodiment of the present invention.

For the purpose of promoting an understanding of the principles of the invention, reference will now be made to the embodiments illustrated in the drawings, and specific language will be used to describe the same. It will, nevertheless, be understood that no limitation of the scope of the invention is thereby intended; any alterations and further modifications of the described or illustrated embodiments, and any further applications of the principles of the invention as illustrated therein are contemplated as would normally occur to one skilled in the art to which the invention relates.

The present invention relates to a system for obtaining medical diagnostic images that are easier to compare with prior images of the same structure. While the present description will be given in terms of oral structures, such as teeth, the principles of the invention may easily be applied to other medical diagnostic scenarios such as, for example, mammography or endoscopy.

Furthermore, while the illustrated embodiment uses video to acquire the new image stream, it will be understood by those skilled in the art that other means for acquiring a series of images (such as a fixed camera or self-contained frame grabber) may be used without undue experimentation.

Still further, while the illustrated embodiment and associated description uses the term "correlation" to indicate a measure of similarity between two images (quantified as a "correlation value"), any metric and method that would occur to one skilled in the art may be used for this comparison. The terms "similarity," "similarity calculation," and "similarity value" refer herein to the full scope of available metrics and methods that one skilled in the art might use in the context of this invention. For example, the various correlation calculations shown in U.S. Pat. Nos. 5,907,641, 5,987,162, and 5,982,915 (hereby incorporated by reference, as if included in their entireties) may be used.

Generally, the system 20 illustrated in FIGS. 1 is used by an operator (not shown) to acquire one or more new images of a diagnostic subject 30 (illustrated here as a tooth), such that the new images show the diagnostic subject 30 from approximately the same angle and orientation, with similar lighting and magnification (and/or distance from the subject 30) as does a reference image 48. The operator aims camera 22 in the general direction of the diagnostic subject 30, and the camera 22 captures video 24 of the diagnostic subject 30. The video stream 24 is displayed on monitor 51 along with the reference image 48. The operator uses this video feedback to position and control the camera 22 so that the frames of the video signal approximate the reference image 48. The video signal 24 output from camera 22 comprises image frames 42, 44, and 46, which are processed by logic and storage unit 50. One or more of video frames 42, 44, and 46 are selected for storage in storage 52 based on their degree of similarity to reference image 48. Diagnosis or study related to diagnostic subject 30 is then carried out using the selected frames.

System 20 will now be discussed in further detail with continuing reference to FIG. 1. Video stream 24 of diagnostic subject 30 is acquired by camera 22, which in this example is an intra-oral camera such as model LS1 manufactured and marketed by Sony Electronics. Other models and manufacturers may, of course, be used, and the invention may easily be applied in different medical diagnostic contexts as will occur to those skilled in the art.

Video stream 24 comprises a series of video frames illustrated here as frames 42, 44, and 46. In operation, a doctor, nurse, or technician (generically "operator" herein) aims camera 22 at the diagnostic subject 30 so that most of the frames 42, 44, and 46 in video stream 24 show all or part of diagnostic subject 30. Video feedback techniques (described in more detail below) provide assistance to the operator as he or she controls the position, zoom, rotation, focus, and other properties of camera 22 to match the qualities of the newly captured images to the reference image, and thereby achieve the best possible results.

The video stream 24 is transmitted from the camera to logic and storage unit 50, which in this example is a general-purpose computer. Correlator 54 receives the video stream 24 and compares each frame 42, 44, and 46 to reference image 48, which is stored in storage 52. The level of correlation between a given frame and the reference image 48 is expressed by a number, the correlation value. The correlation value is communicated to processor 56, which operates switch 58 as described below to store in storage 52 the video frames 42, 44, and 46 that best correlate to reference image 48.

Video processor 53 retrieves from storage 52 the reference image 48 and the images previously selected from video frames 42, 44, and 46, then displays them on monitor 51 using any of the many techniques that would occur to one skilled in the art. For example, the illustrated embodiment displays the reference image (shown here as reference image 48A) in the center of a 3×3 array of images. Previously captured images 41, 43, 45, 47 are displayed in other cells of the array, with the current image 49 displayed in a highlighted cell, as indicated by a heavier bordering line around current image 49 compared to the other images 41, 43, 45, and 47 illustrated on monitor 51. In the present example, alternating scan lines for image 49 are drawn from the reference image 48A and from the current video frame of video stream 24. The operator, therefore, receives feedback by way of image 49 to assist in achievement of proper positioning, orientation, and control of camera 22 to acquire a new image 49 of diagnostic subject 30 that closely matches reference image 48.

In other embodiments, image 49 is formed by shadowing the reference image 48 over the current frame of video stream 24. In still other embodiments, the operator observes image 49 (consisting only of the video stream 24) and manually compares it to the reference image 48A on monitor 51, then moves and controls camera 22 as needed to achieve a good match between the current video frame from video stream 24 and reference image 48A.

In the illustrated embodiment, operation of the various elements and components of logic and storage unit 50 is controlled by processor 56 according to programming instructions encoded on a computer-readable medium comprising program store 55. Besides camera 22, additional input device(s) 57 (for example, a keyboard, a pointing device, a microphone, and a portable data storage unit) may be used by the system 20 to receive input from the operator. Besides monitor 51, additional output device(s) 59 (for example, a sound synthesizer and speakers, a printing device, and an additional monitor) may be used by the system 20 to interact with the operator.

Figure 2A:
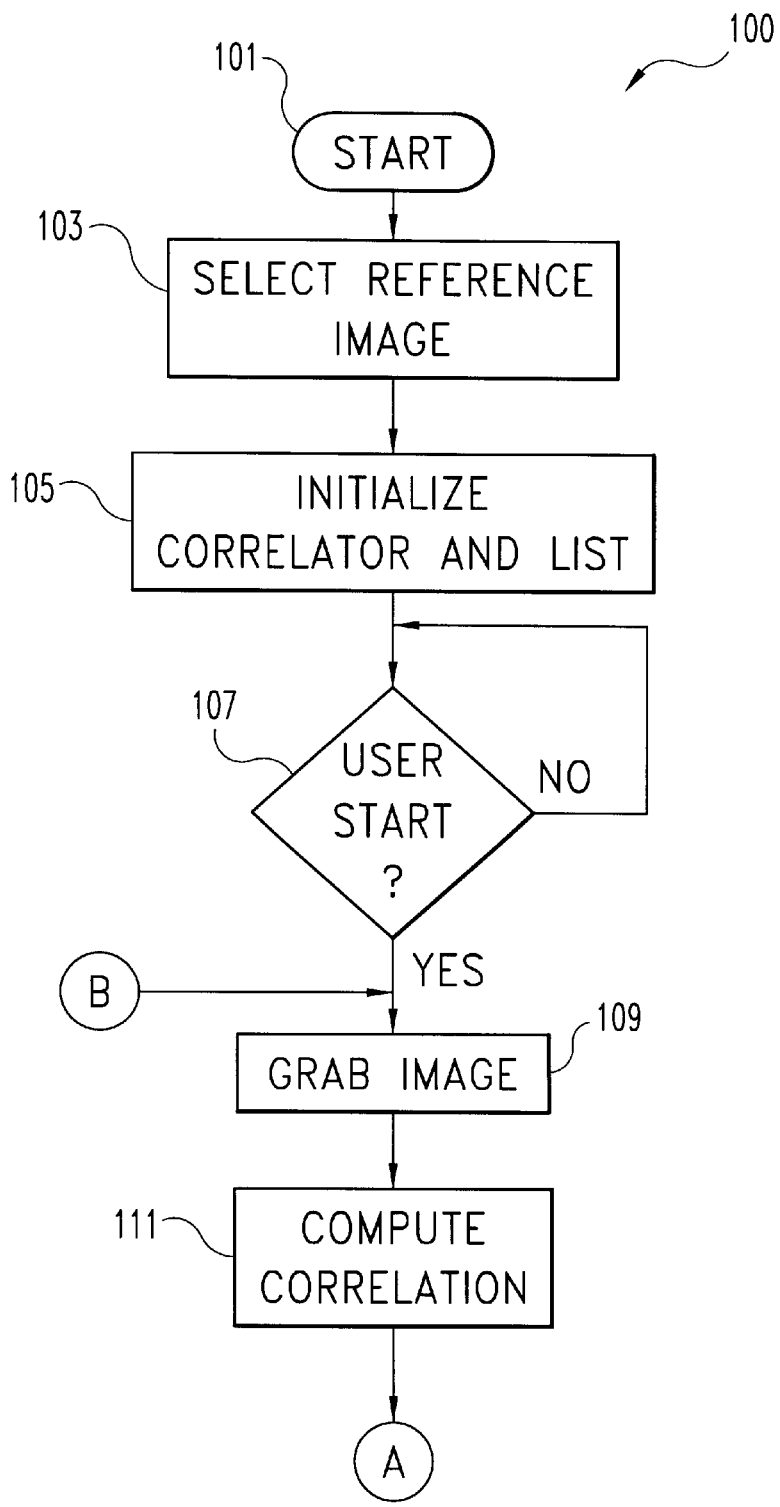
FIGS. 2A and 2B are complimentary portions of a flow chart of an automatic selection process according to one embodiment of the present invention.
Figure 2B:
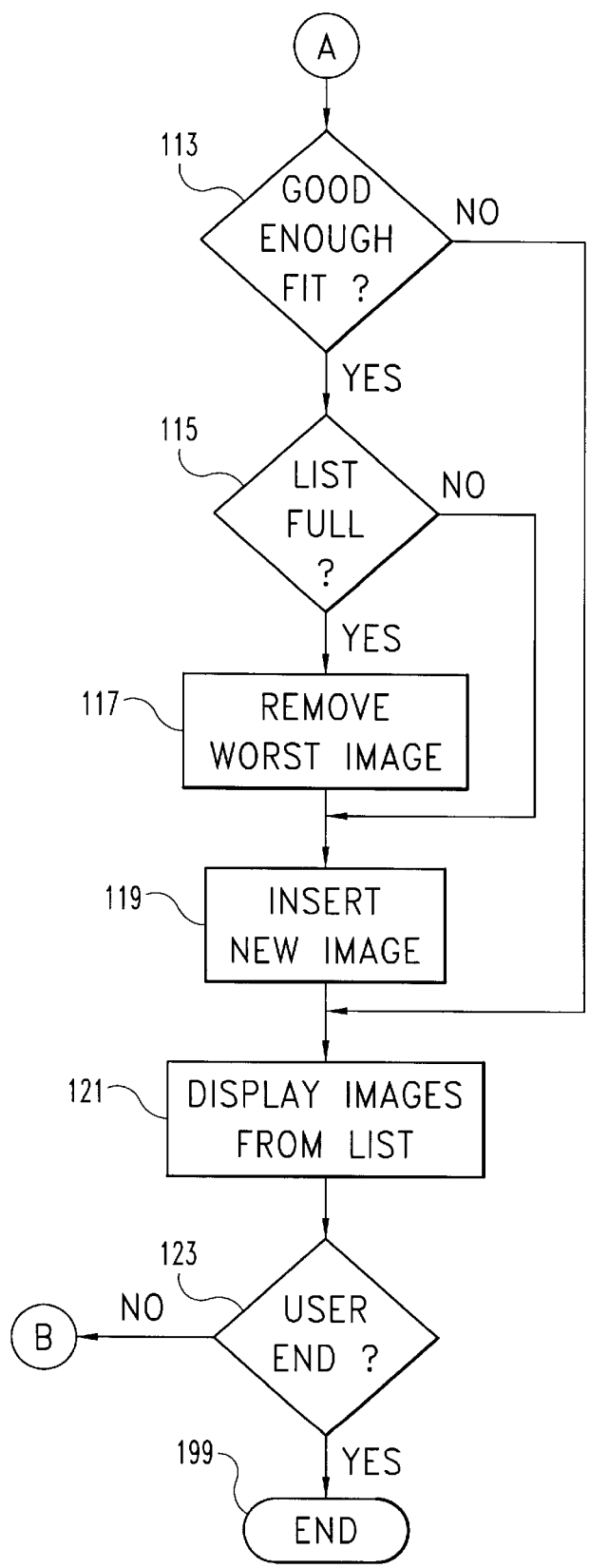

The selection process implemented by system 20 of FIG. 1 will now be described with reference to FIGS. 2A and 2B, and with continuing reference to elements shown in FIG. 1. Process 100 begins at start point 101, and a reference image 48 of the diagnostic subject 30 is acquired or selected (input block 103) using any suitable means. Correlator 54 is initialized (block 105) and an empty list of images (and their corresponding correlation values) is created, to be filled as process 100 proceeds. The list is preferably implemented as a priority queue keyed on the correlation value of the respective video frames in the list.

The process 100 waits (decision block 107) for the user to start the video capture routine. When the user indicates (positive result at decision block 107) that the process should commence, a frame is grabbed (block 109) from the video stream 24. A correlation value, representative of the level of correlation between the grabbed frame and the reference image 48, is calculated (block 111). This calculation can use any metric that might occur to one skilled in the art. (After the correlation calculation in block 111, the process 100 continues through point A on FIG. 2B.)

Next it is determined (decision block 113) whether the correlation value of the current frame (computed at block 111) is good (high) enough to warrant retention of the frame. In one form of decision block 113, the correlation value for the current frame is compared with the correlation value for the worst-matching frame on the list. If the correlation value for the current frame is higher (positive result at decision block 113), the current frame is retained as will now be discussed in relation to blocks 115–119.

It is first determined (decision block 115) whether the maximum allowable number of images is already in the list. If so (positive result at decision block 115), the worst image on the list is deleted (block 117). Then (or following a negative result at decision block 115) the current frame is inserted (block 119) into the list.

After the insertion (block 119) or a determination that the correlation value is too low to justify retaining the image (negative result at decision block 113), the image/frame display on monitor 51 is updated (121) to reflect the current list of "best" images. The process 100 checks (decision block 123) whether the operator has signaled the end of the image acquisition phase. If so (positive result at decision block 123), process 100 ends at end point 199. If not (negative result at decision block 123), process 100 continues (via point B back to FIG. 2A) by grabbing (block 109) another image from the video stream 24.

Many alternative display schemes may be used with the present invention. In one arrangement, a single image is displayed on monitor 51; while in other arrangements, two or more images are displayed simultaneously (side-by-side, in an array, etc.) or in alternating scans. In any of these arrangements, the images being displayed may be the reference image, the video stream 24, one or more previously selected images (e.g., image 41, 43, 45, or 47), or a combination thereof formed by alternating lines or overlaying any of the above, using any means, arrangement, format, and technique that might occur to one skilled in the art.

Figure 3:
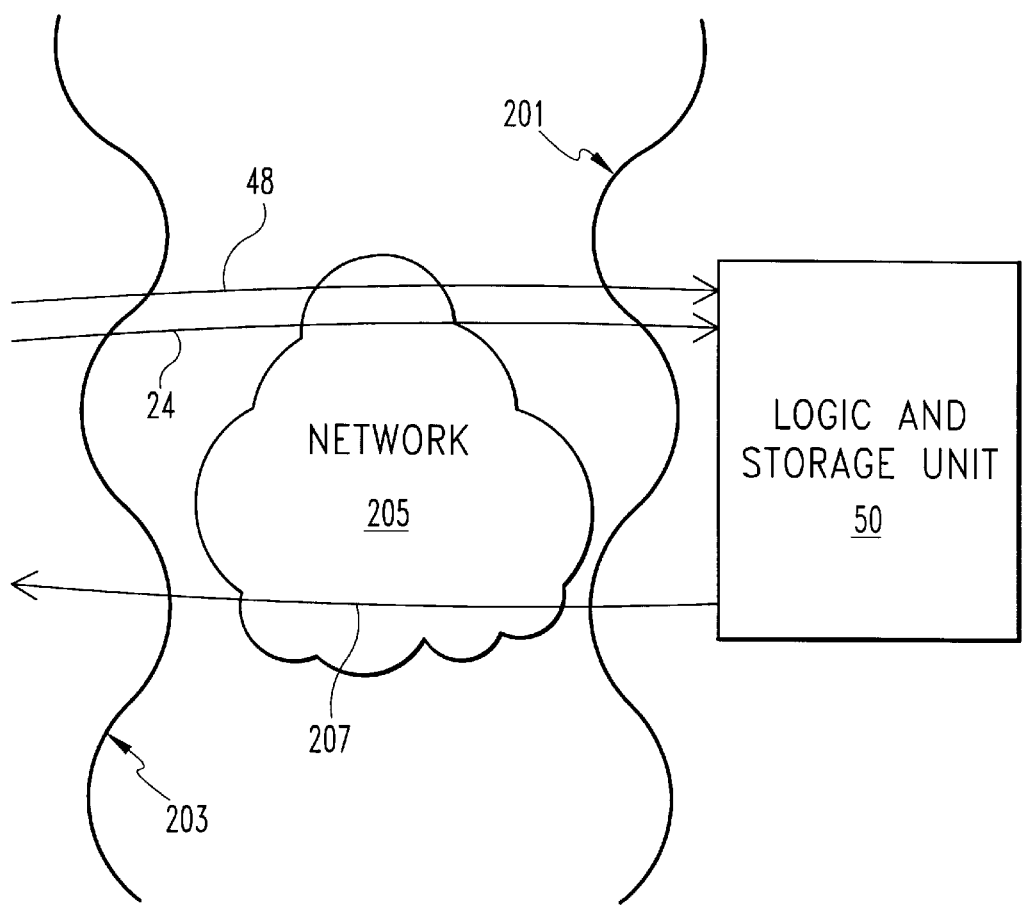
FIG. 3 is a partial block diagram of a remote access storage and analysis system for use with one embodiment of the present invention.

In an alternative embodiment illustrated in FIG. 3 (with reference numerals from FIGS. 1, 2A, and 2B being re-used here for analogous components), the processing illustrated and discussed above in relation to logic and storage unit 50 (in FIG. 1), and process 100 (except the display at block 121 in FIGS. 2A and 2B) is done remotely from the diagnostic subject 30 by an independent service vendor (ISV) 201. The video stream 24 and reference image 48 are transmitted from a patient location 203 through a network 205 (for example, the Internet) to the ISV 201. The ISV 201 selects the best image(s) 207 from the video stream 24 as described above in relation to FIGS. 1, 2A, and 2B (see especially blocks 111, 113, 115, 117, and 119 of FIGS. 2A and 2B). ISV 201 then sends those best image(s) 207 back to the patient location 203 through network 205.

Additional interconnections, processors, and networking elements may be added to or substituted for the items described herein. Furthermore, all or some of the elements of logic and storage unit 50 (such as correlator 54 and switch 58) may be implemented in software executed by processor 56.

In some embodiments of the present invention, the additional input device(s) 57 (see FIG. 1) may be used to accept override input from the operator. For example, if the operator considers one of the images in the current list of "best" images to be unacceptable (or simply less desirable than another), an override input signal related to that image triggers deletion by processor 56 of that image from the current list of images to be stored. Other operator override signals may be implemented without undue experimentation by those skilled in the art.

In various embodiments of the present invention, some or all of the components, structures, and tasks disclosed herein may be implemented by one or more general-purpose computers, such as those manufactured by Dell, Compaq, and IBM. In some embodiments, some or all of the components, structures, and tasks disclosed herein may be implemented by one or more application-specific integrated circuits (ASICs). Furthermore, in many embodiments, the correlation calculation may be implemented in one or more analog components.

Other wiring, networking, and storage structures may be used as appropriate for a particular implementation of the present invention and would occur to one skilled in the art.

Modifications of the present disclosure and claims, as would occur to one skilled in the art, may be made within the scope of the present invention. While the disclosure above has been made in relation to preferred embodiments, the scope of the invention is defined by the claims appended hereto.

What is claimed is:

1. A diagnostic imaging system, comprising:
    a reference image of a diagnostic subject at a first point in time;
    an image capturing device outputting an image stream comprising a plurality of captured images each showing the diagnostic subject at a point in time later than the first point in time;
    an evaluator in communication with said image capturing device, said evaluator taking said reference image and said image stream as inputs, and outputting a similarity signal that indicates a level of similarity between said reference image and each of the captured images;
    a display showing at least a part of the image stream; and
    an image repository for storing selected ones of the captured images from said image stream in automatic response to said similarity signal.

2. The diagnostic imaging system of claim 1, wherein said display also presents said reference image.

3. The diagnostic imaging system of claim 2, wherein said display also presents p of the captured images stored in said image repository, where p is at least one.

4. The diagnostic imaging system of claim 3, wherein p is at least two.

5. The diagnostic imaging system of claim 1, wherein the diagnostic subject is an oral structure.

6. The diagnostic imaging system of claim 1, wherein said image capturing device has a hand-held lens component.

7. A diagnostic imaging system, comprising:
    a reference image of a diagnostic subject at a first point in time;
    an image capturing device outputting an image stream comprising a plurality of captured images each showing the diagnostic subject at a point in time later than the first point in time;
    an evaluator in communication with said image capturing device, said evaluator taking said reference image and said image stream as inputs, and outputting a similarity signal that indicates a level of similarity between said reference image and each of the captured images; and
    an image repository for storing selected ones of the captured images from said image stream in automatic response to said similarity signal;
    wherein said similarity signal represents a similarity value; and
    said image repository stores a given captured image if said similarity value corresponding to the evaluation of said given captured image exceeds a predetermined threshold.

8. A method, comprising:
    capturing an image stream comprising a plurality of m captured images showing a medical diagnostic subject;
    comparing each of said plurality of captured images with a reference image of the medical diagnostic subject to yield a result value for each of said plurality of captured images;
    automatically selecting and storing n of the m captured images based on the result value for each of the m captured images, where n<m;
    simultaneously displaying the reference image and at least one of the n selected and stored images; and diagnosing a medical condition using the reference image and at least one of the n selected and stored images.

9. The method of claim 8, wherein said displaying comprises overlaying one of the n captured images onto the reference image.

10. The method of claim 9, wherein said displaying comprises showing the difference between the one of the n captured images and the reference image.

11. The method of claim 9, wherein said displaying comprises interlacing the reference image and one of the n captured images.

12. The method of claim 8, wherein said displaying comprises showing n copies of the reference image, each being shown side-by-side with a respective one of the n captured images.

13. The method of claim 8:

said comparing further comprising generating a similarity signal that indicates a level of similarity between the reference image and a current captured image; and said selecting operates as a function of the similarity signal.

14. The method of claim 13, wherein said storing comprises accepting the current captured image for storage when the similarity signal indicates a level of similarity to the reference image that is at or above a predetermined reference level.

15. The method of claim 8, further comprising:

subjectively comparing at least one of the n captured images with the reference image.

16. The method of claim 8, wherein said selecting and storing comprises accepting an override signal from the operator to delete a previously selected image.

17. A system, comprising:

data storage containing a reference image of a diagnostic subject;

an image stream comprising a plurality of captured images showing the diagnostic subject;

a processor in communication with said data storage and receiving said image stream; and a computer-readable medium encoded with programming instructions and in communication with said processor;

said programming instructions being executable by said processor to:

calculate a similarity value for each of the plurality of captured images, where the similarity value for a particular captured image reflects the degree of similarity between the reference image and the particular captured image; and selecting and storing selected ones of the plurality of captured images based on the similarity value for those selected ones.

18. The system of claim 17, wherein said programming instructions are further executable by said processor to:

simultaneously display the reference image and one or more of the stored images.

19. The system of claim 17, wherein:

said image stream comprises a number m of captured images; and said programming instructions are executable by said processor to select and store the n best images, where n<m.

20. A method, comprising:

receiving an image stream comprising a plurality of m captured images showing a medical diagnostic subject;

comparing each of said plurality of captured images with a reference image of the medical diagnostic subject to yield a comparison result value for each of said plurality of captured images;

selecting and storing n of the m captured images based on the comparison result value for each of the m captured images, where n<m; and transmitting at least one of the n selected and stored images for use in medical diagnosis.

21. The method of claim 20, wherein:

higher comparison result values indicate greater similarity to the reference image; and said selecting and storing operates to store the n images with the highest comparison result values.

* * * * *